United States Patent [19]
Brahms et al.

[11] Patent Number: 5,497,417
[45] Date of Patent: Mar. 5, 1996

[54] SWITCHING DEVICE FOR TRANSMITTING TELECOMMUNICATION SIGNALS

[75] Inventors: Martin Brahms; Wolfgang Fritz, both of Hanover; Werner Klamt, Algermissen, all of Germany

[73] Assignee: ke kommunikations-Elektronik GmbH & Co., Hanover, Germany

[21] Appl. No.: 212,960

[22] Filed: Mar. 14, 1994

[30] Foreign Application Priority Data

Mar. 19, 1993 [DE] Germany ............... 43 08 783.3

[51] Int. Cl.$^6$ ................................................. H04M 7/00
[52] U.S. Cl. .................... 379/399; 379/345; 333/175; 333/176
[58] Field of Search ................... 379/124, 143, 379/146, 251, 347, 349, 351, 399, 400–409, 344, 345, 346, 338; 333/100, 117, 119, 126, 172, 175, 176, 205

[56] References Cited

U.S. PATENT DOCUMENTS

| | | | |
|---|---|---|---|
| 3,609,248 | 9/1971 | Wolf et al. | 379/87 |
| 3,617,640 | 11/1971 | Cichanowicz | 379/69 |
| 3,643,173 | 2/1972 | Whitten | 330/253 |
| 3,941,935 | 3/1976 | Vicentini et al. | 379/124 |
| 4,115,668 | 9/1978 | Skrovanek et al. | 379/412 |
| 4,701,947 | 10/1987 | Stader | 379/124 |
| 4,750,200 | 6/1988 | Sato et al. | 379/251 X |
| 4,829,517 | 5/1989 | Malek | 379/124 X |
| 4,879,746 | 11/1989 | Young et al. | 379/399 |
| 5,072,200 | 12/1991 | Ranky | 333/175 X |
| 5,151,936 | 9/1992 | Riedle | 379/403 |
| 5,172,411 | 12/1992 | Gazsi | 379/402 |
| 5,175,763 | 12/1992 | Gazsi | 379/402 |

FOREIGN PATENT DOCUMENTS

| | | | |
|---|---|---|---|
| 0206279 | 12/1986 | European Pat. Off. | 379/124 |
| 59-134970 | 8/1984 | Japan | 379/124 |
| 63-067068 | 3/1988 | Japan | 379/124 |

OTHER PUBLICATIONS

"Design of Hybrid Integrated RC Active Filter", Iwata et al., Review of Electrical Communications Laboritories, vol. 26, No. 3–4, Mar.–Apr. 1978, pp. 565–577.
"Basic Engineering Circuit Analysis", David J. Irwin, copyright 1990, MacMillan Publishing Company, N.Y., N.Y. pp. 643–657, ISBN 0-02-359881-6.

*Primary Examiner*—Ahmad F. Matar
*Assistant Examiner*—Scott L. Weaver
*Attorney, Agent, or Firm*—Ware, Fressola, Van Der Sluys & Adolphson

[57] ABSTRACT

A switching device is presented for the transmission of telecommunication signals between a telephone network exchange and at least one subscriber connected thereto, where the exchange is able to transmit metering pulses, in addition to the voice signal. The signals are transmitted as digital signals between the exchange and the subscriber via a two-wire line, Which is connected with the exchange through a hybrid switching unit. To prevent the metering pulses from interfering with the voice signals, a parallel resonant circuit consisting of an inductance and a capacitor is connected to the two-wire system of the hybrid switching unit, and the receiving branch of the hybrid switching unit has an active and a passive filter connected in series. The passive filter is adjusted for the metering pulse frequency, and a filter that is tuned to the passive filter is used as the active filter, which compensates for a decrease in the NF (low frequency) level caused by the passive filter, with a corresponding increase.

8 Claims, 2 Drawing Sheets

SWITCHING DEVICE FOR TRANSMITTING TELECOMMUNICATION SIGNALS

TECHNICAL FIELD

The invention concerns a switching device for transmitting telecommunication signals between a telephone network exchange and at least one subscriber connected thereto, in which the exchange also transmits metering pulses in addition to voice signals, where the exchange on the one hand, and the subscriber on the other, each have system units between which the voice signals are transmitted as digital signals via a two-wire line, where the system units, in addition to analog/digital converters, contain a hybrid switching unit with a transformer for connecting a two-wire system to a four-wire system, and in which the two-wire system containing the primary winding of the transformer is connected to the exchange, while the four-wire system, which consists of a receiving and a sending branch and contains the secondary transformer winding, is connected to the two-wire line leading to the subscriber (Technical Information "PCM4A-System" from ke Kommunikations-Elektronik GmbH & Co., Hannover, July, 1991).

BACKGROUND OF THE INVENTION

Such a switching device is used to better utilize cable installations that consist of copper lines. In the known process according to the above described Technical Information, four subscribers and their telephones are connected to only one two-wire line, by inserting the system units.

In the known process, the letters "PCM" represent pulse-code-modulation. In this instance, the transmission of the signals takes place after digitalization between the exchange and the subscribers at a transmission rate of 144 kbit/s, as the useful bit rate. The analog voice signals are digitalized at the exchange or at the subscribers, then transmitted through the two-wire line and converted back to analog voice signals at the end of the transmission path. The digitalized voice channels are transmitted between the subscribers and the exchange, or vice versa, through the two-wire line in four channels of 32 kbit/s each. The switching device can also be used for other transmission rates and other subscriber numbers.

In addition to other components, to which analog/digital converters belong in particular, each of the system units contains a hybrid switching unit. In conjunction with a transformer, a hybrid switching unit serves to connect a four-wire system, which contains a transmitting branch and a receiving branch, with a two-wire system, or vice versa. The transformer is located between the two-wire system and the four-wire system.

In addition to the analog voice signals—in the following called "NF" for short—the exchange also transmits metering pulses, which have a frequency of 16 kHz, for example. They are superimposed on the NF. The system unit filters out the metering pulses and transmits them separately through the two-wire line.

Independently of the transmission of the metering pulses to the subscriber, not addressed in this instance, it must be ensured that they do not impair the NF transmission. While the NF level is at about 1 V, the metering pulses are at a level of about 12 V. They must therefore be suppressed by the hybrid switching unit, until they are no longer present at its analog input. Otherwise NF distortions could be produced. Furthermore there is the danger of the hybrid switching unit's components being overmodulated.

SUMMARY OF THE INVENTION

The invention has the task of configuring the switching device described at the beginning in such a way, that any effect of the NF transmission by the metering pulses is excluded.

According to the invention, this task is fulfilled in that:

a parallel resonant circuit consisting of an inductance and a capacitor is switched into the two-wire system;

a passive and an active filter are connected in series in the receiving branch of the hybrid switching unit;

the passive filter is adjusted for the metering pulse frequency, and the active filter is a filter tuned to the passive filter, which compensates for a decrease in the NF level caused by the passive filter, with a corresponding increase.

The parallel resonant circuit acts as a prefilter. It has low resistance and therefore does not affect the NF transmission. The parallel resonant circuit attenuates the metering pulse level by 10 dB, for example. This means lowering the level at least by the factor of "3". This ensures that the amplifier output of the hybrid switching unit is not overloaded.

The passive filter is designed for the frequency of the metering pulses, for example for 16 kHz. It provides the greatest suppression of the metering pulses. Their level is decreased to about ⅟₃₀, for example. This filter acts as a band-elimination filter. Its attenuation is very high for a determined frequency, 16 kHz in this instance. By contrast, the NF transmission range—300 to 3400 Hz—is not significantly affected. The passive filter causes a slight decrease in the NF level towards higher frequencies. This decrease is balanced by the active, for example two-stage filter, which exhibits an increase in level in the area where the passive filter caused the decrease. Thus, the NF level is constant at the analog input.

BRIEF DESCRIPTION OF THE DRAWINGS

A configuration example of the invention is illustrated by the drawings, where.

BEST MODE FOR CARRYING OUT THE INVENTION

Figure 1:
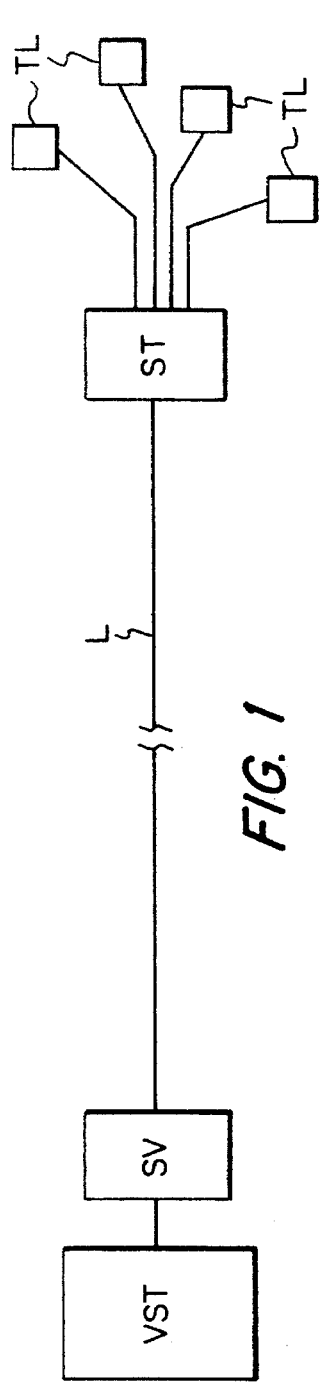
FIG. 1 schematically depicts a transmission path of digital signals.

According to FIG. 1, four subscribers TL are connected to the exchange VST of a telephone network. The telecommunication signals are transmitted as digital signals between two system units SV and ST via a two-wire line L. The exchange VST is connected on one side, and the subscribers TL on the other side of analog sides SV and ST of the system units.

Figure 2:
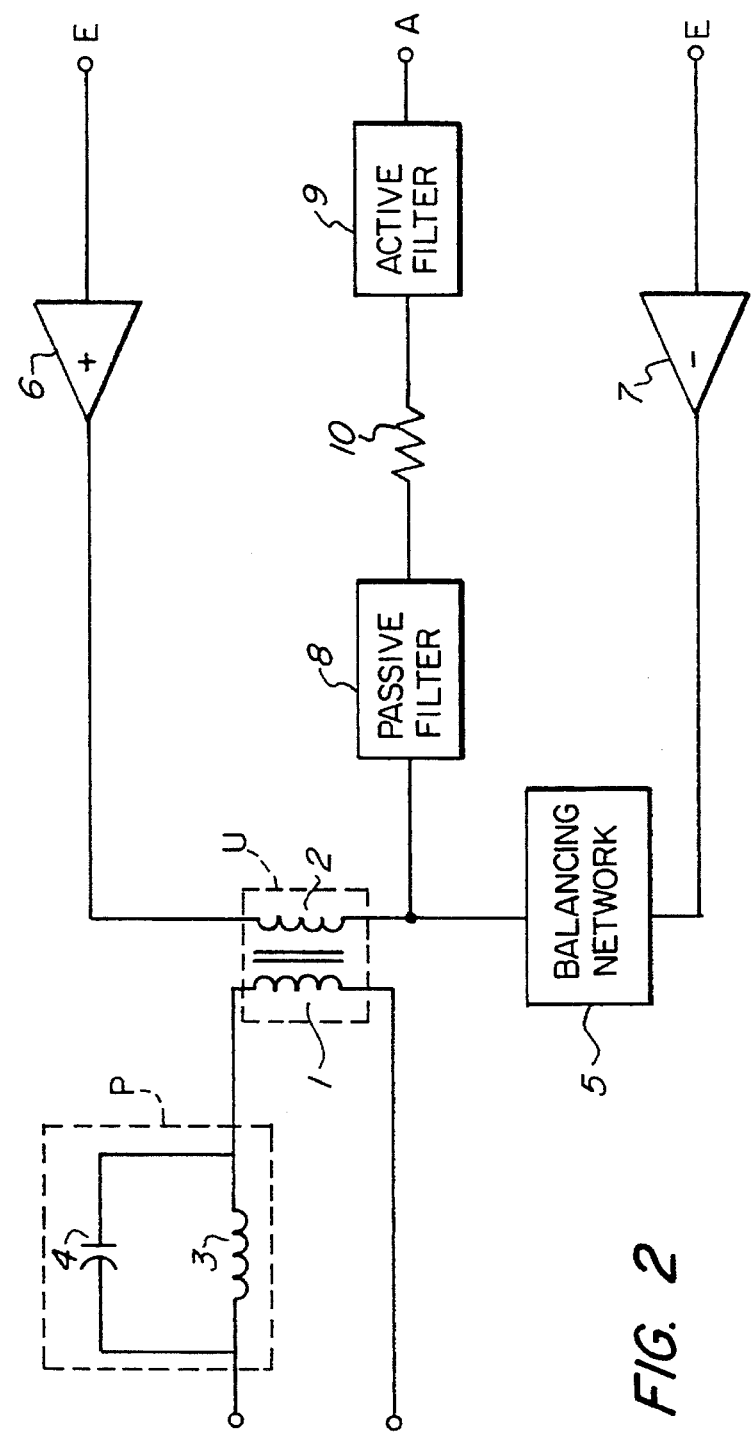
FIG. 2 illustrates a switching device according to the invention.

In addition to an A/D converter and other components, the system unit SV contains a hybrid switching unit, as shown for example in FIG. 2. This hybrid switching unit has a transformer Ü, which is encased by a broken line. The transformer Ü has a primary winding 1 and a secondary winding 2. A two-wire system, which is linked to the exchange VST, is connected to the primary winding 1. The two-wire system contains a parallel resonant circuit P, encased by broken lines, which consists of an inductance 3 and a capacitor 4.

A four-wire system, which consists of a transmitting branch and a receiving branch, is connected to the secondary winding 2 of transformer Ü. A balancing network 5, for the reflection-free adjustment of transformer Ü, is placed in series with the secondary winding 2. The secondary winding 2 is symmetrically located in the transmitting branch, in which amplifiers 6 and 7 function. The digital transmission signal is supplied to the transmitting branch via input E.

The receiving branch of the four-wire system consists essentially of a passive filter 8 and an active filter 9 in series with the former. A high-value resistor 10 belonging to filter 9 provides a high-impedance terminal load to filter 8, which is important for its function. The analog voice signal has a constant level at the output A of the four-wire system.

Figure 3:
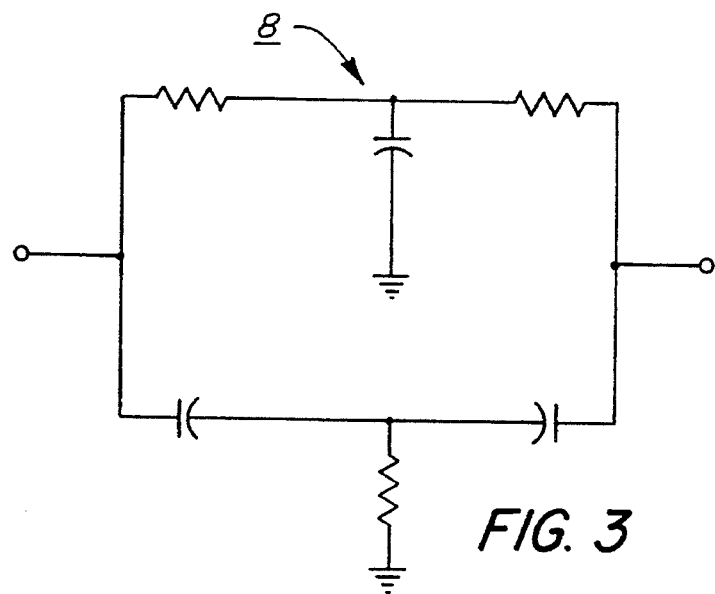
FIGS. 3 and 4 show details of the switching device in FIG. 2.
Figure 4:
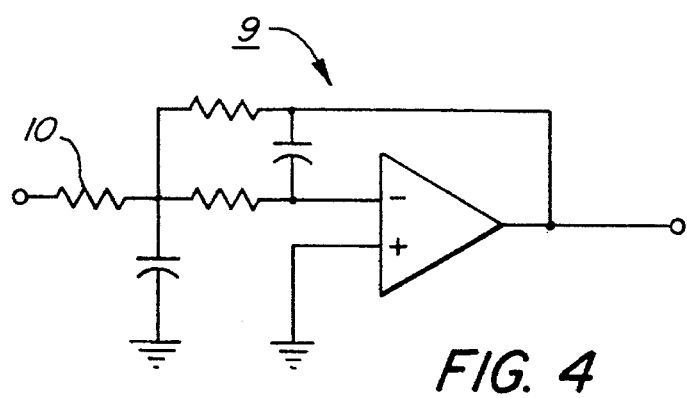
Figure 5:
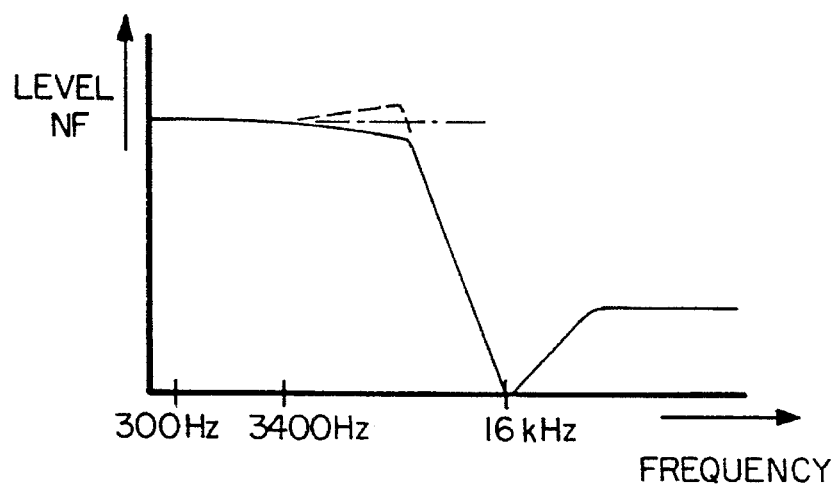
FIG. 5 depicts the NF level process.

The passive filter 8 is preferably configured as a double-T filter, as shown in FIG. 3. It is designed for 16 kHz and suppresses most of the metering pulses. Thus, it is a band-elimination filter with very high attenuation, which, however, does not significantly affect the NF transmission range. Due to the passive filter 8, the NF level decreases somewhat towards the higher frequencies, as depicted by the curve in FIG. 5. The decrease in the NF level is compensated for by the active filter 9. As shown in FIG. 4, in the preferred configuration, filter 9 has at least two stages. It is tuned to the passive filter 8 and produces an increase in the NF level according to the broken line in FIG. 5, at the place where the passive filter 8 causes a decrease. The constant NF level at output A of the four-wire system is illustrated by broken lines in FIG. 5.

We claim:

1. A switching device for transmitting telecommunication signals between an exchange of a telephone network and at least one subscriber device with which metering pulses in addition to voice signals are transmitted by the exchange, in which the exchange and the subscriber device are each allocated system units between which the voice signals are transmitted as digital signals via a two-wire line, and in which the system units, in addition to analog/digital converters, have a hybrid switching unit with a transformer for connecting two-wire line to a four-wire line, and in which the two-wire line containing the primary winding of the transformer is connected to the exchange, while the two wire line leading to the subscriber device is connected to a four-wire line, consisting of a transmitting branch and a receiving branch, and containing the secondary winding of the transformer, characterized in that the two-wire line contains a parallel resonant circuit (P), which consists of an inductance (3) and a capacitor (4), a passive filter (8) and an active filter (9) are connected in series in the receiving branch of the hybrid switching unit;

the passive filter (8) is tuned for attenuating the frequency of the metering pulse, and the active filter (9) is tuned to the passive filter (8), so as to compensate for a decrease in the level of the voice signals caused by the passive filter (8), by generating a corresponding increase in the voice signal.

2. A switching device according to claim 1, characterized in that a double-T filter is used as the passive filter (8).

3. A switching device according to claim 2, characterized in that at least a two-stage filter is used as the active filter (9).

4. A switching device according to claim 1, characterized in that at least a two-stage filter is used as the active filter (9).

5. A hybrid switch for transmitting telecommunications signals between an exchange of a telephone network and at least one subscriber device, the hybrid switch comprising:

a transformer having a primary winding and a secondary winding;

a parallel resonant circuit connected to the transformer's primary winding; and a four-wire line connected to the transformer's secondary winding, the four wire line further comprising a transmitting branch comprising a first amplifier connected to one side of the transformer's secondary winding, a second amplifier connected to the other side of the transformer's secondary winding, and a balancing network connected in series between the second amplifier and the other side of the secondary winding, and a receiving branch connected to the transmitting branch between the balancing network and the other side of the transformer's secondary winding, the receiving branch further comprising a passive filter tuned for attenuating metering pulse frequencies and an active filter connected in series to the passive filter, the active filter being tuned to the passive filter so as to compensate for an attenuation of voice signals caused by the passive filter.

6. The switch of claim 5, wherein the passive filter comprises a double-T filter.

7. The switch of claim 6, wherein the active filter comprises a two-stage filter.

8. The switch of claim 6, wherein the active filter comprises a two-stage filter.

* * * * *